UNITED STATES PATENT OFFICE.

DAVID RODGERS, OF PATERSON, NEW JERSEY.

PLASTIC MATERIAL FOR MANUFACTURING SHUTTLES, BOBBINS, &c.

SPECIFICATION forming part of Letters Patent No. 627,207, dated June 20, 1899.

Application filed December 24, 1898. Serial No. 700,266. (No specimens.)

*To all whom it may concern:*

Be it known that I, DAVID RODGERS, a citizen of the United States, residing at Paterson, in the county of Passaic and State of New Jersey, have invented certain new and useful Improvements in Plastic Material for the Manufacture of Shuttles, Bobbins, Quills, and Kindred Articles; and I do declare the following to be a full, clear, and exact description of the invention, such as will enable others skilled in the art to which it appertains to make and use the same.

The invention has for its object the production of a plastic compound for the production of shuttles, bobbins, quills, and kindred articles used in the manufacture of textile fabrics. In the manufacture of silk those articles are usually made of wood, wood fiber, or papier-mâché; and it is further the object of this invention to provide a material that will cheapen the cost of production of said articles, to reduce their liability to be affected by heat or cold, dampness, or moisture, and to make them hard, light, and durable.

Besides being proof against warping and chipping a further object of my invention is to provide a material of any color desired for the purposes hereinafter stated.

My composition consists of the following ingredients combined in equal parts or in varying proportions, according to the degree of hardness required, viz: wool-flock, resin, terra-alba, china-clay, Brits white, grated potatoes, aluminium, shellac, alcohol, and coloring-matter. Some or any of these ingredients may be substituted by other ingredients which are their chemical equivalents or which will give to the articles molded from the said plastic material the qualities desired and herein set forth without departing from the essential spirit of my invention. For instance, turpentine may be substituted for alcohol, grated turnips for potatoes, and so on with the other ingredients above mentioned.

The process or processes of manufacturing shuttles, bobbins, quills, &c., from the above-mentioned ingredients is or are as follows: All the solids are reduced to powder, and then all of the ingredients are placed in a suitable vessel and thoroughly mixed. Then the whole is submitted to a heat sufficiently intense to cause the whole to become a plastic mass. The agitating or mixing is continued during the heating process and until the substance has assumed a consistency easily to be worked. The plastic substance is then placed in molds and is submitted to a pressure of two thousand (2,000) or more pounds to the square inch.

When a bobbin is not molded in one piece, the parts are secured together by adhesives under a pressure or may be screwed together.

The bobbin, shuttle, or quill thus produced from my new and useful composition possesses all of the characteristics above set forth as the objects of my invention. Although one or more of the above ingredients may be changed or omitted without greatly impairing the result sought for, yet I find the best results from the use of all as above described. My new and useful composition produces in the articles made therefrom tenacity, toughness, durability, and resistance to atmospheric changes, heat, cold, or dampness.

Many resins and gums soluble in turpentine, alcohol, or other spirit may serve the same purpose, and other fibrous material than wool-flock may be employed, but not quite as advantageously.

While I am aware that there are many plastic compositions in commercial use, I am not aware that the ingredients in my composition or any similar or equivalent combination has been used together for the purposes herein specified.

The shuttles, quills, and bobbins made of my material are more evenly balanced than those made of wood, wood fiber, or paper, and not being so porous they do not absorb moisture and warp.

The coloring ingredient in my new and useful plastic composition may be varied in order to enable each manufacturer to have bobbins, quills, or shuttles of such a color that he may be able to identify them at a glance.

Each manufacturer can have a color of his own. This will be a feature that recommends itself to dealers in raw silk and silk in various stages of manufacture.

In molding my plastic composition any ordinary mold or dye may be used which is adapted to give the required internal and external shapes to the articles to be made. The dyes may be divided or made in sections to permit the removal of the molded article and may have central punches or mandrels to form the central bore or opening therein. There is no necessity for the dipping of the said articles when molded in varnish or other material to give them a higher degree of finish, as the finish of the articles made from my composition when pressed and dried is such as to produce a surface that needs no roughening nor addition of emery to prevent the silk or other thread from slipping.

With this description of my invention, what I claim, and desire to secure by Letters Patent, is—

The herein-described composition of matter, to be used for making shuttles, bobbins, quills and kindred articles, used in the manufacture of textile fabrics, consisting of wool-flock, resin, terra-alba, china-clay Brits white, grated potatoes, aluminium, shellac, alcohol, and coloring-matter, in the proportions specified.

DAVID RODGERS.

Witnesses:
JOHN F. KERR,
WM. M. DREW.